United States Patent [19]
Andrew et al.

[11] Patent Number: 5,612,499
[45] Date of Patent: Mar. 18, 1997

[54] METHOD OF INSERTING A SENSOR INTO A PIPELINE

[75] Inventors: Bill D. Andrew, Tulsa; Edward W. Levy, Jennings, both of Okla.

[73] Assignee: TDW Delaware, Inc., Wilmington, Del.

[21] Appl. No.: 435,966

[22] Filed: May 5, 1995

[51] Int. Cl.[6] .................................................. G01M 19/00
[52] U.S. Cl. ........................... 73/866.5; 348/84; 137/318
[58] Field of Search ............................... 73/866.5, 865.8; 137/317–325; 348/84

[56] References Cited

U.S. PATENT DOCUMENTS

| | | | |
|---|---|---|---|
| 4,067,353 | 1/1978 | DeHoff | 137/318 |
| 4,096,754 | 6/1978 | Beveridge, Jr. et al. | 73/756 X |
| 4,177,676 | 12/1979 | Welker | 73/866.5 X |
| 4,275,592 | 6/1981 | Atwood et al. | 73/866.5 |
| 4,546,789 | 10/1985 | Taylor | 137/245.5 |
| 4,582,089 | 4/1986 | Nimberger | 137/884 |
| 4,638,668 | 1/1987 | Leverberg et al. | 73/866.5 |
| 4,649,948 | 3/1987 | Hudson | 137/15 |
| 5,025,670 | 6/1991 | McNulty et al. | 73/865.8 |
| 5,174,325 | 12/1992 | Okel et al. | 73/866.5 X |
| 5,385,060 | 1/1995 | Wang | 73/866.5 |

FOREIGN PATENT DOCUMENTS

| | | | |
|---|---|---|---|
| 75257 | 4/1986 | Japan | 73/865.8 |
| 108961 | 5/1986 | Japan | 73/866.5 |
| 105212 | 5/1991 | Japan | 73/866.5 |

*Primary Examiner*—Thomas P. Noland
*Attorney, Agent, or Firm*—Head, Johnson & Kachigian

[57] ABSTRACT

A method of inserting a sensor into a pipeline including the steps of securing a fitting onto the pipeline, tapping an opening in the pipeline through the fitting, installing a housing on the fitting, the housing having a nipple extending at an angle to the pipeline, attaching a sensor insertion assembly to the nipple, the insertion assembly having a launch tube movable axially between the insertion assembly and the pipeline, extending the launch tube from the insertion assembly and through the pipeline opening into the pipeline, the launch tube intersecting the pipeline at an acute angle and providing communication between the sensor insertion assembly and the interior of the pipeline, and passing a sensor from the insertion assembly and through the launch tube into the pipeline.

12 Claims, 5 Drawing Sheets

5,612,499

METHOD OF INSERTING A SENSOR INTO A PIPELINE

BACKGROUND OF THE INVENTION

1. Field of the Invention

The present invention is directed to an apparatus to insert a sensor into and remove a sensor from a pipeline and a process to insert a sensor into and remove a sensor from a pipeline. In particular, the present invention is directed to a sensor insertion apparatus and process therefor which is used to perform inspection services in pressurized pipelines.

2. Prior Art

In pressurized pipeline systems such as water or gas distribution lines or drain or disposal lines that transport fluids, it is sometimes desirable to inspect the internal condition of the pipeline for proper care and maintenance. These pipelines are subject to damage, blockage or other wear. Video cameras have been developed which are tethered by an electrical push/pull cable which is used to move the video camera inside of the pipeline. Visual inspection of the internal condition of the pipeline is, thus, possible from a remote location.

Ideally, the video camera equipment may be inserted into the pipeline while the pipeline is still pressurized and still in use.

Accordingly, it is a principal object and purpose of the present invention to provide an insertion system for a sensor such as a camera to permit inspection of pipeline systems during in-use, pressurized conditions.

It is a further object and purpose of the present invention to provide a sensor insertion system that will allow inspection in both directions in the pipeline.

It is a further object and purpose of the present invention to provide a sensor insertion system which includes a fitting that is adaptable to tapping equipment and to other maintenance equipment.

It is an additional object and purpose of the present invention to provide a sensor insertion system which includes a mechanism to assist in navigating the sensor cable through the insertion apparatus.

SUMMARY OF THE INVENTION

The present invention provides a sensor insertion apparatus and a process to insert a sensor into and remove a sensor from a pipeline. A sensor, such as a video camera, is employed. The insertion apparatus is connected with and operates in conjunction with a tubular pipeline having an axis.

The apparatus includes a fitting in fluid-tight engagement with the pipeline, the fitting terminating in a top flange.

Secured to the top flange of the fitting is a sensor housing having an open base which is in fluid-tight engagement with the fitting. The sensor housing includes a pair of outwardly extending nipples, each of which is in communication with an open interior of the housing. Each nipple is arranged so that it is at an acute angle to the housing and also at an acute angle to the pipeline axis.

The open interior of the sensor housing receives a completion plug which is movable vertically in relation to the pipeline axis. The completion plug is also expandable radially to engage the interior of the housing to retain the plug in fluid-tight engagement. The plug is movable by means of a control bar which extends through and out of the housing.

An elongated sensor insertion assembly is connected and attached to one of the nipples. When attached, the sensor insertion assembly is in axial alignment with the nipple. The insertion assembly includes a cylindrical housing. The insertion assembly also includes a cylindrical launch tube or spoon in axial alignment with the cylindrical housing. The launch tube is movable axially between a position retracted within the cylindrical housing of the insertion assembly and a position partially within the pipeline. The launch tube is movable axially by means of a jacking assembly.

The launch tube has an externally extending cylindrical control bar which extends axially from the launch tube. The cylindrical control bar passes through the jacking assembly to move the control bar and, thus, the launch tube axially.

The sensor is tethered to a push/pull cable that passes through the launch tube and through the jacking assembly to be connected with a drive motor mechanism.

The entire procedure to install and utilize the sensor insertion apparatus may be performed while the pipeline is in use and pressurized.

DETAILED DESCRIPTION OF THE PREFERRED EMBODIMENTS

Figures 1, 2:
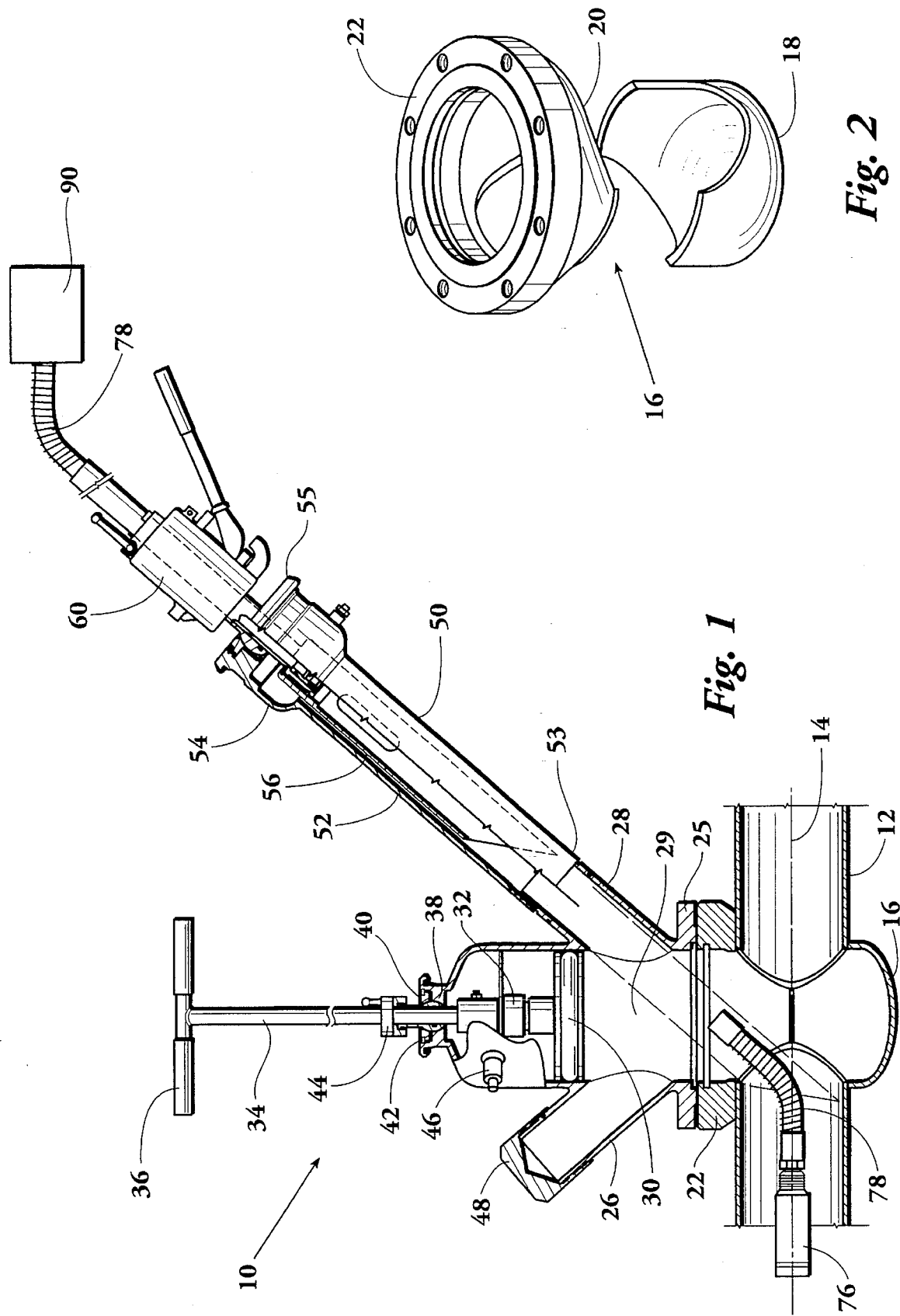
FIG. 1 is a partially cutaway, sectional view of a sensor insertion apparatus constructed in accordance with the present invention.
FIG. 2 is an exploded view of a fitting which is a part of the sensor insertion apparatus shown in FIG. 1.

Referring to the drawings in detail, FIG. 1 illustrates a sensor insertion apparatus 10 which has been partially cut away for ease of comprehension. In the preferred embodiment to be described herein, the sensor to be employed is a video camera as will be described herein. The apparatus 10 is connected with and operates in conjunction with a tubular pipeline 12 having an axis 14.

The apparatus 10 includes a fitting 16 in fluid-tight engagement with the pipeline. The fitting 16 is shown apart from the apparatus and pipeline in FIG. 2. In the present embodiment, the fitting 16 includes a lower member 18 and an upper member 20, each of which is welded to the pipeline. It will be understood that other fittings might be employed within the scope of the present invention.

The upper member 20 terminates in a flange 22. As will be described herein, the flange 22 will be used to connect other elements of the invention and also to connect tapping and other maintenance equipment, as may be required from time to time.

Returning to a consideration of FIG. 1, secured to the flange 22 of the fitting 16 by fasteners or other mechanism is a sensor housing 24. The sensor housing 24 has an open base at flange 25 which is in fluid-tight engagement with the fitting flange and the fitting 16.

The housing 24 includes a pair of outwardly extending nipples 26 and 28 that are in communication with an open interior 29 of the sensor housing. Each nipple is arranged so that it is at an acute angle to the housing 24 and also at an acute angle to the pipeline axis 14.

The open interior 29 of the housing 24 receives a completion plug 30 which is movable vertically in relation to the pipeline axis 14.

In FIG. 1, the plug 30 is shown in the raised, open position. The plug 30 is held in place by a plug holder 32 which, in turn, is connected to a control bar 34 which extends through and out of the housing 24. The control bar terminates in a handle 36 by which the plug 30 may be moved vertically.

The control bar 34 passes through an opening in the housing 24 which includes a seat 38 for holding a pivot ball 40 and a spiral retaining ring 42.

When the completion plug is in the desired vertical position, the control bar 34 may be locked in place by a control bar clamp 44.

The sensor housing 24 also includes a bleed valve 46 in communication with the interior of the housing. When the inspection procedure is not underway, each of the nipples 26 and 28 will be closed and covered by a cap 48 as shown on nipple 26. The cap 48 has internal threads which mate with external threads on the nipple.

As seen in FIG. 1, an elongated sensor insertion assembly 50 is connected and attached to nipple 28. The sensor insertion assembly 50 is in axial alignment with the nipple 28. The insertion assembly 50 includes a cylindrical housing 52 having an open end 53 with internal threads which connect with the external threads on the nipple 28. The opposite end 55 of the cylindrical housing 52 terminates in a seat 54. The sensor insertion assembly 50 includes a cylindrical launch spoon or tube 56 in axial alignment with the cylindrical housing 52. As seen in FIG. 1, the launch tube 56 is movable between a position retracted within the cylindrical housing 52 of the insertion assembly and a position partially within the pipeline 12, as shown by dashed lines. The launch tube 56 is movable axially by means of a jacking assembly 60 which will be explained in detail.

Figure 3:
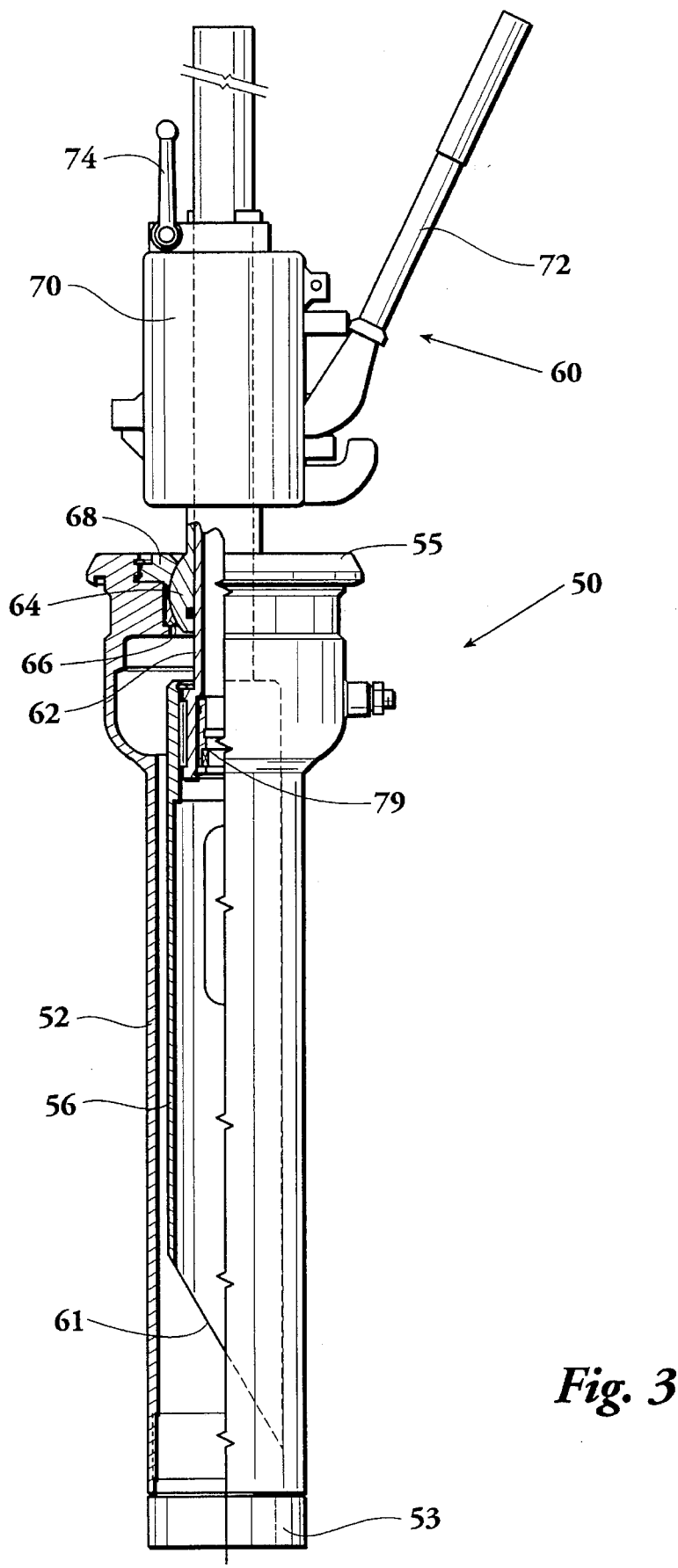
FIG. 3 is a partial sectional view of a sensor insertion assembly and jacking assembly which are a part of the insertion apparatus shown in FIG. 1.

An enlarged detailed view of the insertion assembly 50 and jacking assembly 60 apart from the housing 24 is shown in FIG. 3. A front face 61 of the launch tube is not perpendicular to the tube but is angled.

The launch tube 56 has an externally extending cylindrical control bar 62. The cylindrical control bar 62 extends out of the housing 52. A fluid-tight seal is created through a pivot ball 64 holding an O-ring. The pivot ball allows both rotational and axial movement of the control bar. The pivot ball is retained in a pivot ball seat 66 held in place by a compression nut 68.

The cylindrical control bar 62 passes through the jacking assembly 60 and includes a housing 70 which retains a coiled compression spring through which the control bar passes and a pair of actuators on each end of the spring (not shown). The actuators have a larger diameter recess than the diameter of the control bar. When the jack handle 72 extending from the housing is moved, one of the actuators is canted with respect to the control bar causing the actuator to grasp the control bar. To control and lock the position of the cylindrical control bar 62, a bar clamp 74 is employed to grasp the control bar.

Returning to a consideration of FIG. 1 and FIG. 3, a sensor in the form of a camera 76 is seen within the pipeline 12. The video camera 76 is somewhat smaller than the internal diameter of the pipeline. The camera 76 is tethered to a cable 78. The cable passes through the control bar 62 with a fluid-tight seal at bushing and seal 79.

Figure 4:
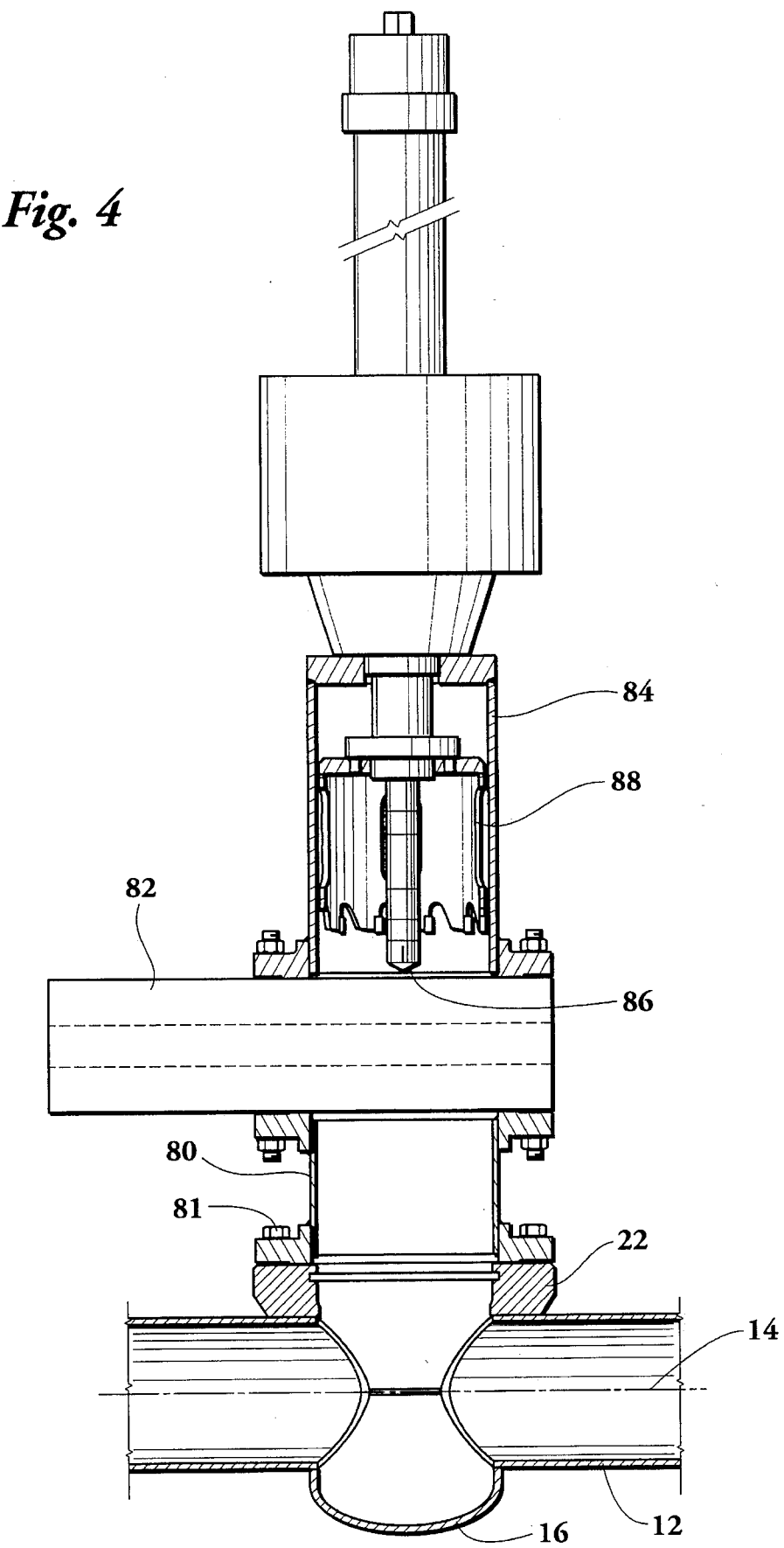
FIGS. 4, 5 and 6 show the sequential process to install and insert a sensor such as a video camera into a pipeline.
Figure 5:
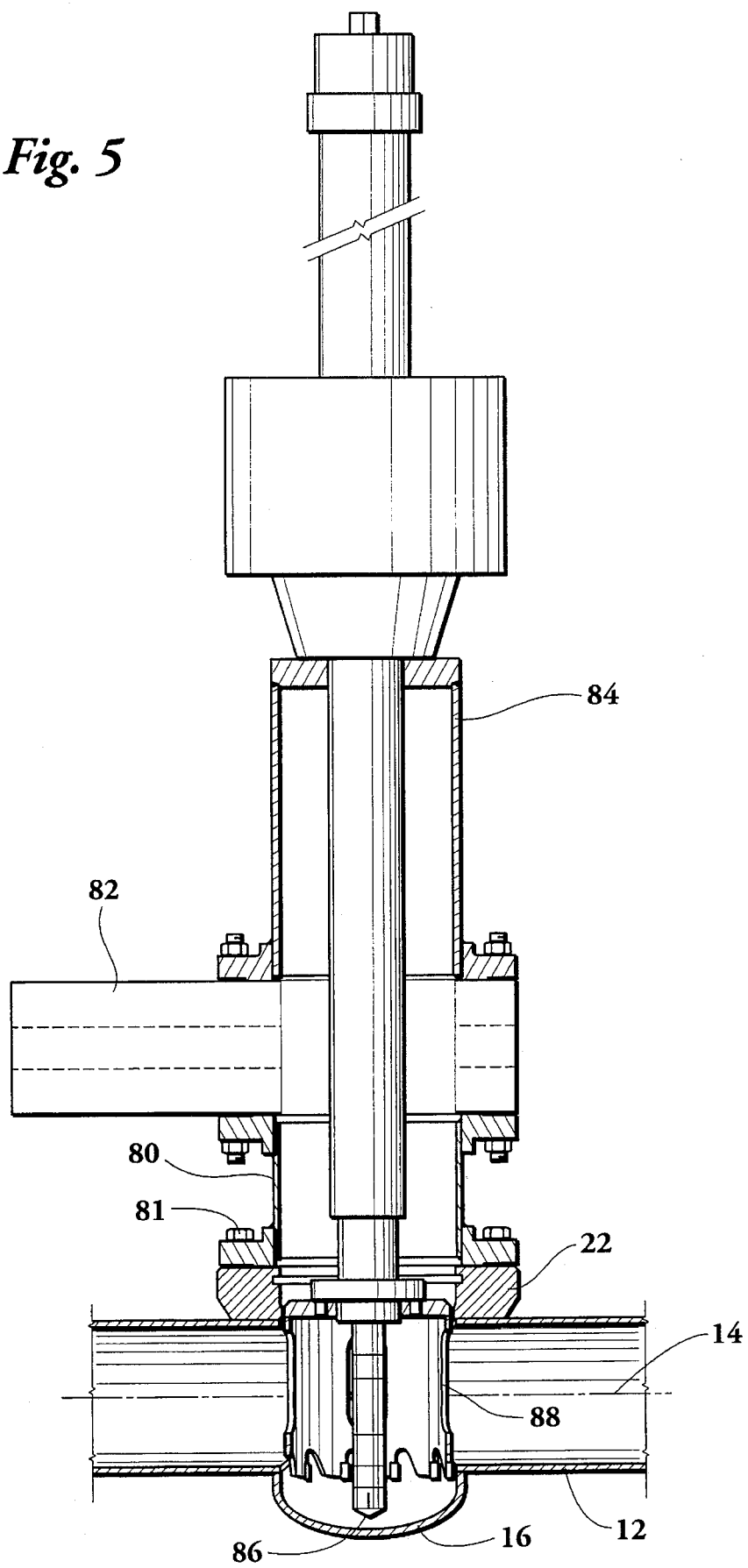
Figure 6:
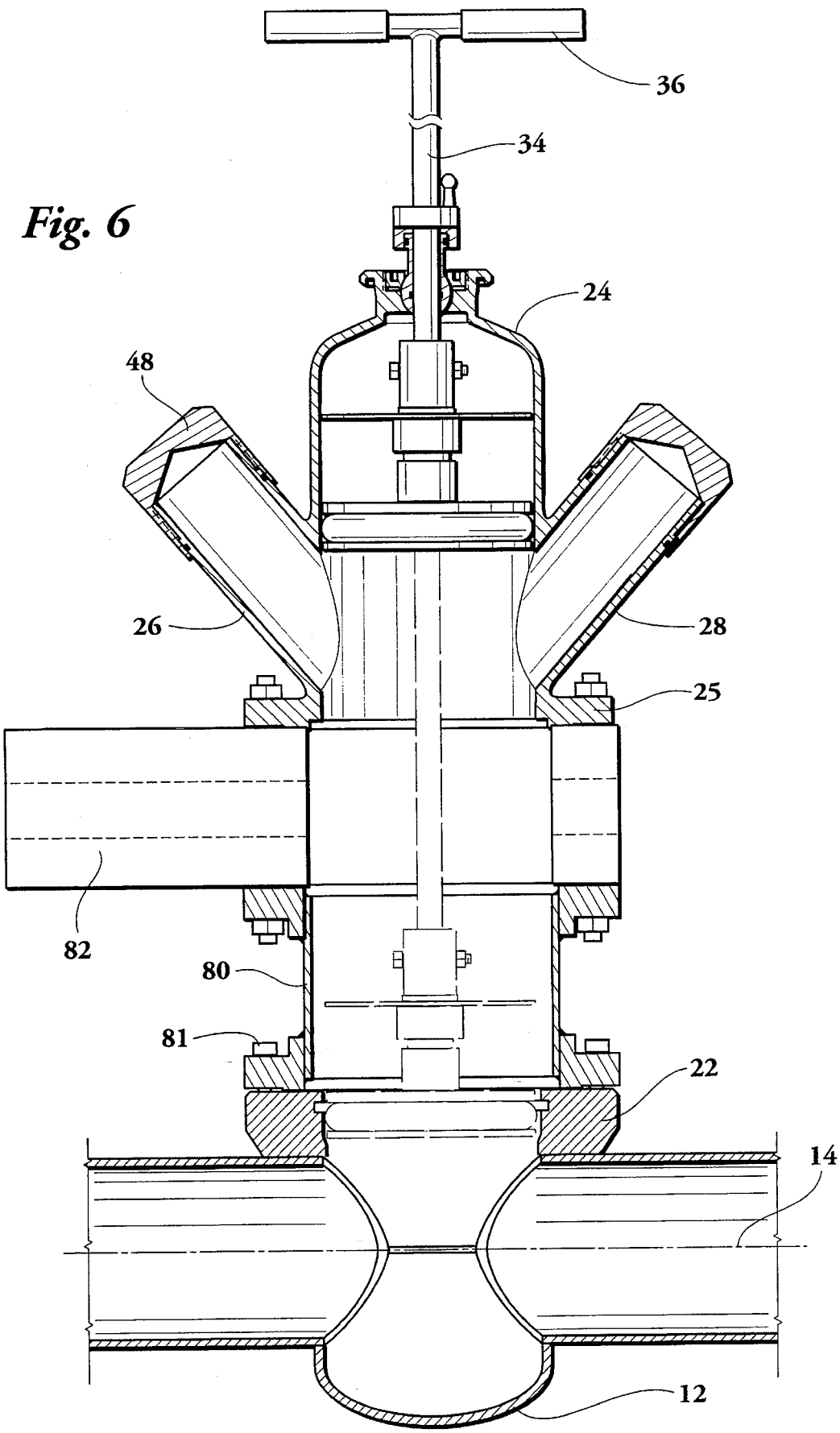

FIGS. 4, 5 and 6 illustrate the sequential procedure to insert a sensor into and remove a sensor from a pipeline 12. Initially, as seen in FIG. 4, the top and bottom members of the fitting 16 are welded to the pipeline 12. An adapter 80 is attached to the flange 22 of the fitting by fasteners 81. Thereafter, a sandwich valve 82 or other type of valve is connected to the adapter. It will be understood that various types of valves may be employed within the scope of the invention.

A tapping machine 84 is connected to the sandwich valve 82. The tapping machine 84 includes a pilot bit 86 and a cylindrical cutter bit 88. Depending on the diameter of the pipeline 12, the cutter bit 88 will cut an opening into the pipeline or will remove an entire section of the pipeline. By way of example but not limitation, an 8" cutter bit applied to a 6" pipeline will remove a section of the pipeline. FIG. 5 illustrates the cutter bit cutting through the pipeline. Thereafter, the cutter bits are retracted into the tapping machine 84 and the sandwich valve 82 is closed. At that point, the adapter 80 is pressurized with a seal created by the sandwich valve 82.

Once this procedure has been accomplished, the tapping machine 84 may be unfastened and removed. As best seen in FIG. 6, the sensor housing 24 is attached by fasteners or other means to the sandwich valve 82. The sandwich valve 82 will be opened and using the control bar, the completion plug will be lowered into the fitting and the control bar will be rotated to radially expand to engage the plug into the fitting and forms a fluid-tight seal. The control bar is detached from the completion plug and the sensor housing is removed, followed by the sandwich valve being removed.

Returning to a consideration of FIG. 1, the sensor housing is thereafter connected to the flange 22 of the fitting. Depending on the direction of the pipeline desired to be inspected, the sensor insertion assembly 50 is attached to one of the nipples, in this case nipple 28. The completion plug is thereafter raised, as shown in position in FIG. 1, by moving the control bar.

Thereafter, the jacking assembly 60 is employed to advance the launch tube 56 into the fitting and pipeline. The launch tube includes a front face which will be perpendicular to the access of the pipeline. Once the camera is in the pipeline, the launch tube is fixed in place by tightening the clamp 74. A pneumatic drive motor assembly, illustrated diagrammatically by box 90, will push the cable 78 through the interior of the launch tube, through the nipple, through the fitting, and into and through the pipeline. Once the inspection has been performed, the video camera can be retracted by retracting the cable in the same procedure.

The completion plug 30 is thereafter lowered into the fitting so that a fluid-tight seal is created. The insertion assembly 50 is thereafter removed by unthreading from the nipple 28.

If the pipeline is to be inspected in the other axial direction, the same procedure is performed with respect to nipple 26.

Whereas, the present invention has been described in relation to the drawings attached hereto, it should be understood that other and further modifications, apart from those shown or suggested herein, may be made within the spirit and scope of this invention.

What is claimed is:

1. A process to insert a sensor into a pipeline having an axis, which process comprises:

securing a fitting onto said pipeline;

tapping an opening in said pipeline through said fitting perpendicular to said pipeline to provide a pipeline opening;

installing a housing on said fitting, said housing having at least one nipple extending at an angle to said pipeline axis;

attaching a sensor insertion assembly to a said nipple, said insertion assembly having a launch tube movable axially between said insertion assembly and said pipeline;

extending said launch tube from said insertion assembly and through said pipeline opening into said pipeline, the launch tube intersecting said pipeline axis at an acute angle and providing communication between said sensor insertion assembly and the interior of said pipeline; and passing a sensor from said insertion assembly and through launch tube into said pipeline.

2. A process to insert a sensor as set forth in claim 1 including the additional step of inserting a removable plug in said fitting to close said pipeline opening.

3. A process to insert a sensor as set forth in claim 1 wherein said launch tube is movable axially by a jacking assembly engaging said launch tube.

4. A process to insert a sensor as set forth in claim 3 including moving said launch tube axially by moving a cylindrical control bar extending from said launch tube with said jacking assembly.

5. A process to insert a sensor as set forth in claim 1 wherein said sensor is a video camera.

6. A process to insert a sensor as set forth in claim 5 including the additional step of passing a camera cable tethered to said camera by passing said cable through said launch tube, through said nipple and through said fitting into said pipeline.

7. A method of inserting a sensor into and remove a sensor from a pipeline having an axis, comprising:

securing a fitting onto the exterior of said pipeline;

tapping an opening in said pipeline through said fitting to form a pipeline opening;

installing a housing on said fitting;

attaching a sensor insertion assembly to said housing, said insertion assembly having a launch tube movable axially from said insertion assembly into said pipeline;

actuating a jack means to extend said launch tube from said insertion assembly through said pipeline opening into said pipeline, the launch tube being in a horizontal plane of said pipeline axis and intersecting said pipeline axis at an acute angle thereby providing communication between said sensor insertion assembly and the interior of said pipeline; and passing a sensor from said insertion assembly through said launch tube into said pipeline.

8. A method of inserting a sensor as set forth in claim 7 including the additional steps of:

removing said sensor from said pipeline;

removing said launch tube from said pipeline; and inserting a plug into said fitting to close said opening in said pipeline.

9. A method of inserting a sensor as set forth in claim 15 wherein said jack means is in the form of a jacking assembly forming a part of said insertion assembly, the jacking assembly engaging said launch tube.

10. A method of inserting a sensor as set forth in claim 9 including moving said launch tube axially by moving a control bar extending from said jacking assembly.

11. A method of inserting a sensor as set forth in claim 7 wherein said sensor is a video camera.

12. A method of inserting a sensor as set forth in claim 7 including the additional step of passing a sensor cable tethered to said sensor through said launch tube by means of a pneumatic drive motor assembly supported to said housing.

* * * * *